United States Patent
Martini et al.

(10) Patent No.: US 11,188,609 B2
(45) Date of Patent: Nov. 30, 2021

(54) DYNAMIC SLOTTING OF CONTENT ITEMS WITHIN ELECTRONIC CONTENT

(71) Applicant: Microsoft Technology Licensing, LLC, Redmond, WA (US)

(72) Inventors: Giorgio Paolo Martini, Palo Alto, CA (US); Nikhil Devanur Rangarajan, Seattle, WA (US); Wen Pu, Santa Clara, CA (US); Keqing Liang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 16/588,485

(22) Filed: Sep. 30, 2019

(65) Prior Publication Data

US 2021/0097126 A1  Apr. 1, 2021

(51) Int. Cl.
  *G06F 16/957* (2019.01)
  *G06F 16/9538* (2019.01)
  *G06F 16/9535* (2019.01)
  *G06F 16/958* (2019.01)

(52) U.S. Cl.
  CPC ........ *G06F 16/9574* (2019.01); *G06F 16/958* (2019.01); *G06F 16/9535* (2019.01); *G06F 16/9538* (2019.01)

(58) Field of Classification Search
  CPC ............. G06F 16/9574; G06F 16/9538; G06F 16/9535; G06F 16/958
  USPC .......................................................... 707/737
  See application file for complete search history.

(56) References Cited

U.S. PATENT DOCUMENTS

| | | | |
|---|---|---|---|
| 10,387,910 B2* | 8/2019 | Gao | G06Q 30/0247 |
| 10,565,622 B1* | 2/2020 | Burstein | G06Q 30/0266 |
| 10,839,100 B2* | 11/2020 | Hollinger | G06F 21/6245 |
| 10,922,722 B2* | 2/2021 | Cetintas | G06Q 30/0269 |
| 2011/0153421 A1* | 6/2011 | Novikov | G06Q 30/0254 |
| | | | 705/14.52 |
| 2014/0101685 A1* | 4/2014 | Kitts | G06Q 30/0242 |
| | | | 725/14 |
| 2018/0300335 A1* | 10/2018 | Drochomirecki | G06F 16/48 |

* cited by examiner

*Primary Examiner* — Dangelino N Gortayo
(74) *Attorney, Agent, or Firm* — Schwegman Lundberg & Woessner, P.A.

(57) ABSTRACT

Techniques for the dynamic slotting of content items within electronic content are provided. In response to receiving a request, a first set of content items is identified and a first score is generated for each based on a first objective. Based on the first scores, a first ranking of the first set of content items is generated. A subset of the first set is selected based on the first ranking. A second set of content items that includes the subset is identified and a second score is generated for each item in the second set based on a second objective that is different than the first objective. Based on the second scores, a second ranking of the second set is generated. A subset of the second set is selected based on the second ranking. The second subset is presented on a computing device that is associated with the request.

18 Claims, 3 Drawing Sheets

DYNAMIC SLOTTING OF CONTENT ITEMS WITHIN ELECTRONIC CONTENT

TECHNICAL FIELD

The present disclosure generally relates to electronic content and, more specifically to, intelligently slotting content items within electronic content in a dynamic manner.

BACKGROUND

The availability of various content items on the Internet allows access to information in bulk. However, the sheer volume of content items available does not increase the usefulness of the content items. The information presented in the content items themselves must be suitable for each particular user. For example, providing content items with information on living and style may be irrelevant to a user interested in learning about current political developments, even though the same content items may be enjoyable for another user.

One approach to determining whether a content item is relevant to a user is to compare attributes of the content item with attributes of the user. If a match score (reflecting a level of match between the attributes) is relatively high, then the user may be more likely to interact with the content item than with another content item with which the user may have a lower match score.

However, relevance between a user and a content item may be only one of multiple possible considerations that a content delivery system might make in determining which of potentially thousands of content items to present to the user. Each consideration may correspond to a different objective. Thus, the selection of a set of content items to present to an individual user becomes a multi-objective optimization problem.

In one approach to handling a multi-objective optimization problem, a first set of content items is ranked according to a first objective and a second set of content items is ranked according to a second objective. The first set of content items is presented in a first set of pre-defined slots in electronic content (e.g., at the top of a web page) while the second set of content items is presented in a second set of pre-defined slots in the electronic content (e.g., below the first set of content items).

However, such an approach is static and rigid. For example, regardless of the quality of the first set of candidate content items, such content items are always presented in the first set of pre-defined slots and may be further visually distinguished from the second set of content items. In order to change the quantity of the first set of content items and/or where the first set of content items will be presented relative to the second set of content items, multiple manual configurations will have to be made, which increases the chance of human error. Furthermore, such an approach is not responsive to changes in online user behavior. For example, users in general may become more interested in content items in the second set, which may mean there should either be changes in the number of content items in the second set or where content items in the second set should appear relative to content items in the first set, or both. With static rules on the number and locations of content items of varying types or associated with differing objectives, each user will have an identical experience with the electronic content with respect to the number and location of the different sets of content items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for dynamically slotting content items in electronic content are described. In one approach, a set of candidate content items is identified and scored according to a first objective. Based on this first set of scores, a subset of the set of candidate content items is selected. The non-selected candidate content items are then scored again with respect to the selected subset, but according to a second objective that is different than the first objective. The selected subset are also scored again according to the first and second objectives. Other content items outside the initial set of candidate content items may be scored according to the second objective. Based on this second set of scores (that take into account, at least partially, the second objective), corresponding content items are ranked and a subset thereof is inserted into various slots of electronic content based on the ranking.

Embodiments described herein improve computer-related technology by avoiding the need to hardcode the number and location of various types of content items. Instead, content items of various types may be inserted based on multiple objectives in a multi-tiered scoring and ranking approach. Additionally, the hardcoding of the number and location of various types of content items may be avoided for all contexts in which content items may be presented.

System Overview

Figure 1:
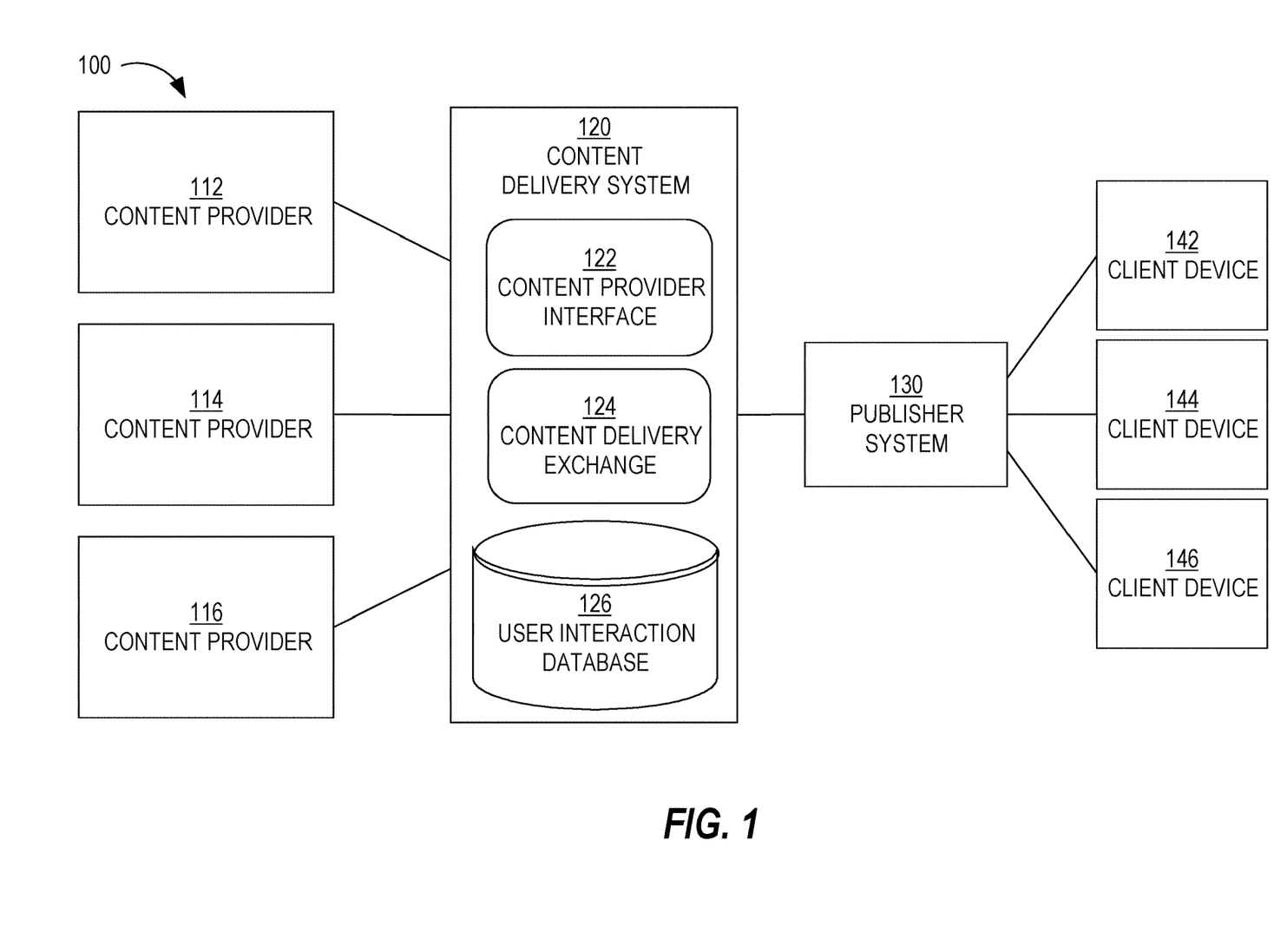
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or a interaction data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

Slots in Electronic Content

Electronic content includes one or more slots for inserting one or more content items. Examples of electronic content include (a) a web page generated by a web browser and (b) a web view displayed through a mobile application, whether a web browser or a native application. Examples of web browsers include Internet Explorer, Google Chrome, and Mozilla Firefox.

The electronic content includes information that is requested by a user of a computing device that presents the electronic content. For example, the electronic content may be a news article, a blog, a job posting, a search page, or a news feed. Any slots in the electronic content are for content items that the user did not specifically request, but may be related to information within the electronic content and/or related to the user. For example, a content item may be a job posting that is presented on a job search page, where the job posting has the same job title as the user. As another example, a content item may be about a product in which users in the same industry as the user are interested.

A slot may be limited to including a maximum of one content item. For example, all slots within a piece of electronic content may include a maximum of one content item. Additionally or alternatively, a slot may include (or "fit") multiple content items. For example, different slots in the same electronic content may include different numbers of content items.

In an embodiment, content items of different types are candidates for insertion into the same slot or set of slots. Thus, a slot may include a content item of one type or a content item of another type. For example, for one user, a slot in electronic content may include a content item of a first type and, for a different user (or the same user at a different time), the slot may include a content item of a second type that is different than the first type.

In a related embodiment, a content item may be one of multiple types. For example, for one user, the content item may be of the first type and, for a different user (or the same user at a different time), the content item may be of the second type.

A content item's type may be determined based on which objective (or utility) is being optimized. An objective is a goal or something that is aimed at. An objective may be an objective of content delivery system 120 and/or of content providers 112-116. Different content providers may have different objectives in having their respective content items presented through content delivery system 120. Content delivery system 120 considers multiple objectives when determining which content items to present and, optionally, where (e.g., which slots) to present the content items. Example objectives include engagement, revenue, form filling, and registrations. Examples of engagement include user selections (e.g., clicks), user selection rate (e.g., click-through rate (CTR)), page views, number of sessions, session length, conversions (e.g., purchases, registrations), and job applications.

A measure for each of multiple objectives may be calculated for each content item. For example, a CTR and an average session length may be calculated for each content item over a period of time (e.g., daily, weekly, and/or monthly). Different content items will have different values for the different objectives. For example, a first content item may have a higher CTR than a second content item, but the second content item may have a higher (e.g., average) session length than the first content item.

Tiered Ranking

In an embodiment, a first set of candidate content items is ranked according to a first objective or utility. The top N ranked content items are selected from that first set and added to a second set of candidate content items. The second set of candidate content items are ranked according to, at least partially, a second objective (or utility) that is different than the first objective. The first objective may be considered when ranking the selected content items from the first set among the other candidate content items of the second set. One or more candidate content items in first set that were not selected may also be added to the second set and, therefore, ranked according to the second objective.

Promoted and Organic Types

In an embodiment, a content item may be one of two types: a promoted type or an organic type. A promoted type of content item (or promoted content item) is one where a provider of the content item (e.g., content provider 112) provides remuneration to content delivery system 120 for presenting the content item, where presentation includes an indication (e.g., a visual indication) that the content item is promoted. An organic type of content item (or organic content item) is one where a provider of the content item does not provide remuneration to content delivery system 120 for presenting the content item. Also, presentation of the content item might not include any highlighting or visual distinguishing from other content items.

In an embodiment, some content items may be a promoted content item at one time and an organic content item at another time. For example, a content provider may be willing to provide remuneration to content delivery system 120 for presenting a particular content item, but is also willing to the particular content item being presented without having to provide such remuneration. Also, other content items may be limited to being only organic content items and, therefore, never promoted content items. Thus, content providers of such organic content items would not provide remuneration to content delivery system 120 for presenting those organic content items.

In an embodiment, instead of one or more slots being designated for promoted content items and one or more slots being designated for organic content items, promoted content items may be presented in any slot or no slot depending on the ranking of the promoted and organic content items together.

Maximum Number of Promoted Content Items Per Electronic Content

In an embodiment, a limit on the number of promoted content items in electronic content is established and enforced. For example, if three is the maximum number of promoted content items that may appear in a web page, then only the three highest ranked content items are eligible for being selected as promoted for the web page. Lower ranked content items may still be considered in the second ranking step that involves ranking organic content items. In the end however, organic content items may have a higher ranking than some or all of those top three promoted content items, resulting in no promoted content items being presented in that instance.

In a related embodiment, different presentation contexts are associated with different limits. A presentation context is a type of content that is requested and displayed on a web page or web view. For example, on a job search results page, the limit on the number of promoted content items is four, while, on a profile page, the limit on the number of promoted content items is two. Additionally, different computing device display sizes are associated with different limits. For example, for a smartphone of typical size, the limit on the number of promoted content items is one while, on a laptop computer with a display of typical size, the limit on the number of promoted content items is four.

In a related embodiment, the device display size and the presentation context are used to determine a limit on the number of promoted content items that may be presented within electronic content.

Selection Process

Figure 2:
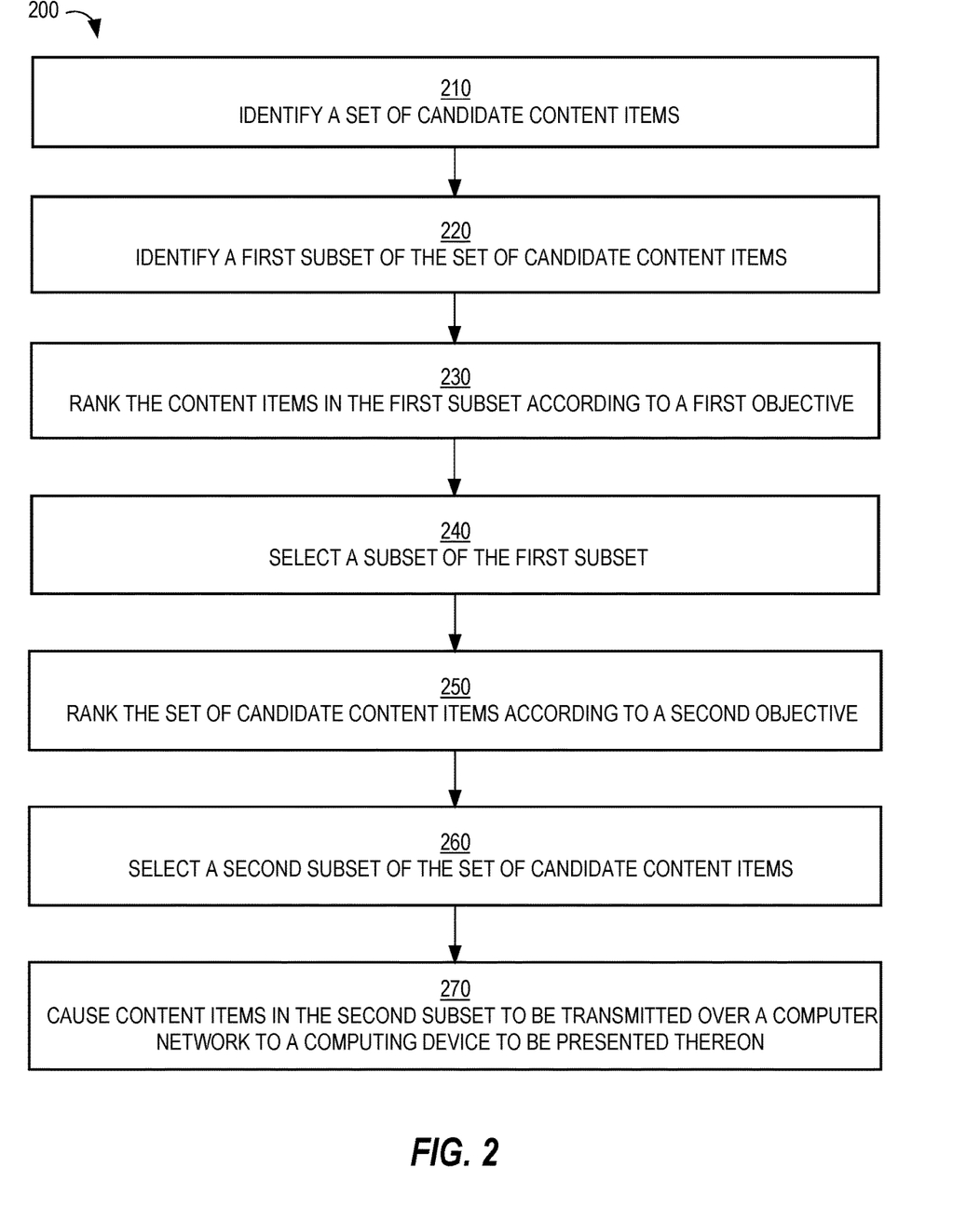
FIG. 2 is a flow diagram that depicts an example process for selecting content items of different types for insertion into one or more slots in electronic content, in an embodiment.

FIG. 2 is a flow diagram that depicts an example process 200 for selecting content items of different types for insertion into one or more slots in electronic content, in an embodiment. Process 200 may be implemented by content delivery exchange 124 or another component of content delivery system 120.

At block 210, a set of candidate content items is identified. The set of candidate content items may be identified in response to a content request from a computing device of a user that operates the computer device. For example, the user may enter a URL into a search field of a web browser executing on the computing device. The URL is of a job search page where the user can specify one or more search criteria to search for job postings. The job search page includes multiple slots into which different content items may be inserted.

The set of candidate content items may be identified as relevant based on, for example, whether one or more attributes of the user, the computing device, and/or the context (e.g., time of day, day of week, geographical location, content within the requested electronic content) satisfy targeting criteria of content delivery campaigns of the candidate content items. Additionally or alternatively, a candidate content item may be relevant if some, but not all, of its corresponding targeting criteria are satisfied by attributes of the user, computing device, and/or the context. Thus, even though there might not be a perfect "match" between a user and a content delivery campaign, a content item of the campaign may be a candidate content item for presentation to the user. For example, a targeting criterion of a content delivery campaign may specify a set of job titles, none of which matches a job title of the user in question. However, other attributes of the user may match other targeting criteria of the content delivery campaign and, therefore, that campaign becomes a candidate campaign and a content item of that campaign becomes a candidate content item.

At block 220, a first subset of the set of candidate content items is identified. The first subset comprises content items of a particular type or content items that pertain to a particular utility or objective. For example, the first subset may comprise only content items that may be promoted. Some content items in the set of candidate content items might not be promotable. For example, such content items might not have any associated bid.

At block 230, content items in the first subset are ranked according to a first objective or utility. The first objective may be related to resource amount or revenue. For example, each content item in the first subset is associated with a user selection rate (e.g., a CTR) and a resource reduction amount (or bid) that is associated with the corresponding content delivery campaign. For example, a user selection rate of a content item is multiplied by a resource reduction amount of the content item to calculate a product that used as a score to rank the content item relative to other content items in the first subset.

The user selection rate may be an actual or observed user selection rate, a predicted user selection rate (e.g., that is generated using a machine-learned model, which may take the actual/observed value as an input to the model), or one that is based on both values, such as an average of the two values. If a predicted user selection rate, then the prediction model that is used to generate such a rate may take into account numerous inputs, such as attributes of the user (e.g., profile attributes) who triggered the content item selection event, attributes of the computing device that the user is operating, attributes of the current context (e.g., time of day, day of week, geographic location), attributes of the corresponding content item (e.g., keywords, online interaction history of the content item, the colors used in an image, targeting criteria), and attributes of the corresponding content provider that provided the content item (e.g., industry, company size, geographic location).

At block 240, a subset of the first subset is selected. For example, the top N ranked content items from the first subset are selected. In an embodiment, these selected content items are considered promoted content items. These selected content items may be visually distinguished, within one or more slots in a piece of electronic content, from other content items that are selected for presentation within slots of the piece of electronic content. Visually distinguishing one content item over another content item may involve using text, font color, font size, background color, and/or graphics. For example, a slot for a promoted content item may have a light blue background while a slot for an organic content item may have a plain white background. As another example, a slot for a promoted content item may have the text "Promoted" or "Sponsored" adjacent to the content item while a slot for an organic content item might not have any adjacent text.

At block 250, the set of candidate content items is ranked according to a second objective or utility. For example, the second objective may be related to engagement, instead of revenue. Each content item in the set of candidate content items (including the first subset that was ranked according to the first utility or objective) is associated with an engagement value, such as a probability of applying to a job or of performing another action as a result of viewing the content item. The engagement value may be a prediction that is computed using one or more machine-learned or rules-based models.

Therefore, content items that were identified for the first subset (in block 220) are ranked twice: once (in block 230) according to one criterion and once (in block 250) according to one or more different criteria.

At block 260, a second subset of the set of candidate content items is selected for presentation based on the ranking in block 250. For example, if a piece of electronic content has ten slots, then the top 10 ranked content items from the set of candidate content items are selected. Some of the selected content items may be promoted content items while others may be organic content items. Alternatively, all of the selected content items are organic content items, which means that the values of the content items (in the first subset) pertaining to the second objective are relatively low compared to the values of the other candidate content items pertaining to the second objective.

At block 270, the content items in the second subset are transmitted over a computer network to a computing device to be presented on a display of the computing device. Data that is transmitted along with content items may include, for each of one or more content items, type data that indicates whether to visually distinguish the content item from other content items in the second subset.

Different Content Items Finally Ranked Using Different Sets of Objectives

In an embodiment, content items that are (a1) identified in the first subset in block 220 but (a2) not selected in block 240 are ranked (in block 250) according to only the second utility or objective (and not the first utility or objective), while content items that are (b1) identified in the first subset in block 220 and (b2) selected in block 240 are ranked (in block 250) according to both utilities or objectives.

For example, content item A is not in the top N ranked content items according to the first utility/objective. For example, content item A is associated with the lowest calculated product (of predicted user selection rate and bid) relative to the calculated products of other "promotable" content items. Thus, content item A is not selected in block 240. However, content item A is still considered in block 250 with respect to the second utility/objective. However, any terms in a scoring/ranking function related to the first utility/objective are ignored when generating a score for content item A. For example, a resource reduction amount (or bid) associated with content item A is set to 0, thus making the value of the term related to the first utility/objective 0.

As another example, content item B is in the top N ranked content items according the first utility/objective. Thus, content item B is selected in block 240. Content item B is also considered in block 250 with respect to the second utility/objective. Terms in the scoring/ranking function related to the first utility/objective are considered when generating a score for content item B. For example, the same value calculated in block 230 is added to a value for the second utility/objective of content item B to produce a final score for content item B.

In some situations, even though a first content item may be associated with a higher value for the first utility/objective than a corresponding value for a second content item (e.g., in block 230), the second content item may be ranked higher in block 250 due to the second content item being associated with a higher value for the second utility/objective than a corresponding value for the first content item.

Example Use Case

Embodiments described herein may be utilized in multiple different scenarios or use cases. One example use case is where the candidate content items are candidate job postings (though the content may change from use case to use case), each corresponding to a different job posting that may be presented if a corresponding job recommendation (that is presented as a result of a content item selection event) is selected. Some job postings are promotable, while some job postings might not be promotable at any time.

For example, in response to a content request, from a client device, that triggers a request to present one or more job recommendations, a first set of candidate job postings is identified. A job posting is identified if the user associated with the client device satisfies (at least partially) the targeting criteria associated with the job posting. The user may be determined based on a user or member identifier that is included in the content request or based on another identifier (included in the content request) that maps to a user/member identifier. The mapping is stored in content delivery system 120 or an associated system. Each identified job posting that is associated with a resource reduction amount is a candidate for the first ranking stage. (If a job posting is not associated with a resource reduction amount, then that job posting is not a candidate for the first ranking stage, but it may be a candidate in the second ranking stage.) The first ranking stage is based on a score that is computed based on the resource reduction amount and a predicted user selection rate (e.g., $score_j = bid_j \times predicted\_CTR_j$ where j is a specific job posting).

If a candidate job posting is associated with a resource limit that has been exhausted (as described in more detail below), then the candidate job posting is excluded from the first set of candidate job postings that is ranked. Thus, such a candidate job posting is not scored.

The top N job postings from the first ranking stage are selected. Thus, the N job postings with the top N scores are selected. Thus, N is the maximum number of promoted slots, which controls the highest permissible promotable content item load. N may be a tunable parameter and may be different for different types of electronic content or different sources of job recommendation requests. For example, for job recommendation requests that are generated when a user visits a job search page, N may be three, while for job recommendation requests that are generated when a user visits a page with a section devoted to jobs the user may be interested in, N may be ten.

However, just because N job postings are selected at the end of the first ranking stage, job recommendations corresponding to such job postings are not necessarily ultimately presented (on a computing device) in response to the triggering request. For example, if there are fewer than N job postings that are sufficiently engaging (that is, their second ranking stage score, or MOO score, is not sufficiently high), then less than N job recommendations will be promoted.

A second set of candidate job postings is identified. The second set may be identical to the first set. This may be possible if there is no candidate job posting whose resource limit is exhausted and/or if there is no candidate job posting that is non-promotable, or one that is not associated with a resource reduction amount. Alternatively, the second set includes the first set and additional candidate job postings, such as job postings whose respective resource limits are exhausted and/or job postings that are non-promotable.

Prior to scoring the candidate job postings in the second set, candidate job postings that are ineligible for being promoted job postings have their resource reduction amount set to zero. Candidate job postings that are eligible for being promoted are untouched. The new resource reduction amounts (or bids) are called "promoted bids" or "proBids":

proBid$_j$=bid$_j$ if j is eligible, proBid$_j$=0 otherwise

Nothing changes for "free" job postings and for otherwise promotable job postings that have exhausted their resource limit, as well as for all eligible job postings.

Each candidate job posting in the second set is scored using a different formula (or model) than the formula used to score the candidate job postings in the first set. An example multi-objective optimization (MOO) formula is the following:

$$moo_j=(1-\mu)*proBid_j*pCTR_j+\mu*pApply,$$

where proBid$_j$ is the resource reduction amount of the $j^{th}$ job posting, pCTR$_j$ is the predicted CTR of the $j^{th}$ job posting, pApply$_j$ is the probability of applying to the $j^{th}$ job posting, and μ is a revenue-engagement tradeoff parameter. The higher μ is set, the higher the weight on the engagement component, which, in this example, is pApply, although other embodiments may include another type of engagement component, such as length of a user session or dwell time on a certain page.

This MOO formula may also have a shadow bid value that is multiplied with pApply$_j$ and that is similar to a resource reduction amount in that it reflects how much engagement in the form of applying to the job posting is worth to content delivery system 120. Such a shadow bid value may be the same for all candidate job postings.

In a scenario where there are M slots in electronic content for M job recommendations, the candidate job postings in the second set that have the top M scores are selected. Thus, even though a promotable job posting may have the highest proBid and pCTR values, such a job posting may not be in the top M candidate job postings if that job posting has a relatively low pApply value.

In a related use case, certain categories of content items are eliminated from consideration as organic content items. For example, job postings from a certain segment of companies may be prevented from appearing as organic job recommendations, while allowing such job postings to appear as promoted job recommendations as long as they have not exhausted their respective resource limits. Another related use case could be dynamically limiting organic job recommendations for job postings that have already appear in a certain number of organic job recommendations in a particular time period (e.g., the current day). To allow for such use cases, it is enough to change the way proBid$_j$ is defined to the following:

proBid$_j$=bid$_j$ if j is eligible; else,
proBid$_j$=−∞ if j is a job posting from a restricted segment;
proBid$_j$=0 otherwise.

Exhausted Resource Limit

In an embodiment, a content delivery campaign is associated with a resource limit (or budget) that dictates a number of times a content item from the content delivery campaign may be presented to end users. Once a campaign's resource limit is reached, the campaign is no longer able to be considered in content item selection events, at least in content item selection events for promotable content items. In order for its content items to be promotable, the campaign's resource limit must be increased based on input from the corresponding content provider or may be increased (or reset) automatically after the end of a current time period (e.g., at the end of the day). Generally, the higher a campaign's resource limit, the more often a content item from the campaign may be considered in a promotable content item. On the other hand, the higher a campaign's resource reduction amount (or bid), the faster the campaign's resource limit will be reached.

In an embodiment, a content item whose associated resource limit is exhausted is not considered in block 220, even though the content item is otherwise promotable. The content item was promotable while its resource limit was not exhausted. However, the content item may still be considered in block 250 where only the second utility or objective is considered in generating a score for the content item.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
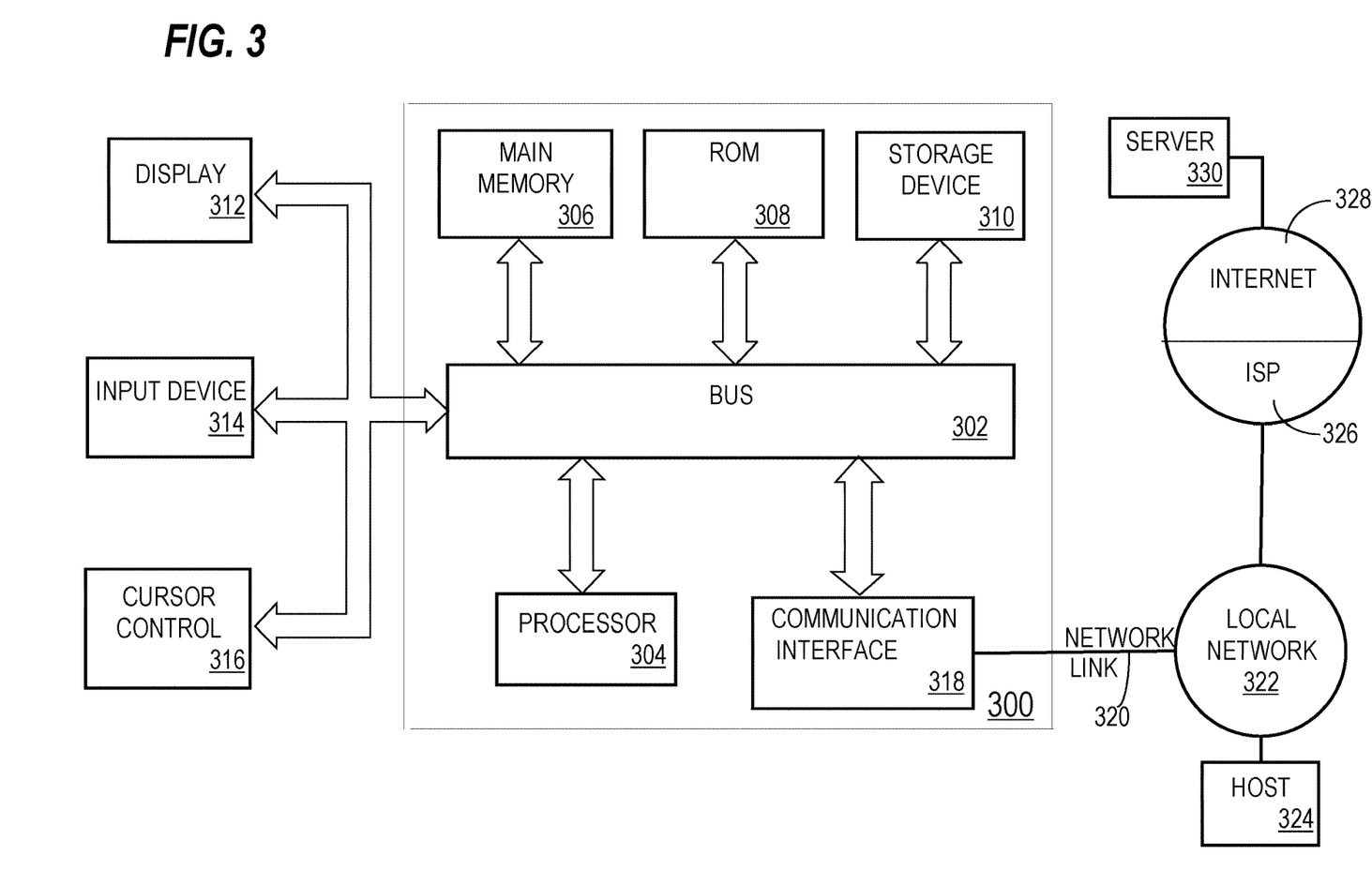
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
in response to receiving a content request for electronic content, using a first targeting criteria to identify a first set of candidate content items;
for each candidate content item in the first set of candidate content items, generating a first score for said each candidate content item based on a first objective;
based on the first score of each candidate content item in the first set of candidate content items, generating a first ranking of the first set of candidate content items;
selecting a first subset of top ranking candidate content items from the first set of candidate content items based on the first ranking;
using a second targeting criteria to identify a second set of candidate content items;
for each candidate content item in the second set of candidate content items and for each candidate content item in the first subset of top ranking candidate content items selected from the first set of candidate content items, generating a second score for said each candidate content item based on a second objective that is different than the first objective;

based on the second score of each candidate content item in the second set of candidate content items and for each candidate content item in the first subset of top ranking candidate content items selected from the first set of candidate content items, generating a second ranking of the respective candidate content items;

selecting a second subset of top ranking candidate content items from the second set of candidate content items and the first subset of top ranking candidate content items, based on the second ranking;

causing each candidate content item in the second subset to be presented on a computing device that is associated with the content request;

wherein the method is performed by one or more computing devices.

2. The method of claim 1, wherein the second subset of candidate content items includes one or more candidate content items from the first subset of top ranking candidate content items selected from the first set of candidate content items and causing each candidate content item in the second subset to be presented comprises:

causing a visual indicator to be presented with each candidate content item of the one or more candidate content items from the first subset of top ranking candidate content items selected from the first set of candidate content items, but not with any other candidate content item in the second subset.

3. The method of claim 1, wherein the second subset of candidate content items includes candidate content items from the first subset of top ranking candidate content items selected from the first set of candidate content items.

4. The method of claim 1, wherein generating the second score comprises:

for each candidate content item in the first subset of candidate content items, generating the second score for each candidate content item based on the first objective in addition to the second objective;

for each candidate content item in the second set of candidate content items but not in the first subset of candidate content items, generating the second score not based on the first objective.

5. The method of claim 1, further comprising, prior to identifying the first subset of candidate content items from the first set of candidate content items:

determining whether a first candidate content item is associated with a first resource limit that has been reached;

in response to determining that the first candidate content item is associated with the first resource limit that has been reached, excluding the first candidate content item from the first set of candidate content items;

determining whether a second candidate content item is associated with a second resource limit that has been reached; and in response to determining that the second candidate content item is associated with the second resource limit that has not been reached, including the second candidate content item in the first set of candidate content items.

6. The method of claim 5, further comprising:

including the first candidate content item in the second set of candidate content items.

7. The method of claim 1, wherein the second objective pertains to a level of engagement.

8. The method of claim 1, wherein the first score is based on a combination of a predicted user selection rate and a resource reduction amount.

9. The method of claim 1, further comprising:

prior to receiving the content request, storing threshold data that indicates (1) a first maximum number of content items of a first type to present in a first presentation context and (2) a second maximum number of content items of the first type to present in a second presentation context that is different than the first presentation context;

identifying the first maximum number based on the electronic content being part of the first presentation context;

wherein selecting the first subset is based on the first maximum number.

10. One or more storage media storing instructions which, when executed by one or more processors, cause:

in response to receiving a content request for electronic content, using a first targeting criteria to identify a first set of candidate content items;

for each candidate content item in the first set of candidate content items, generating a first score for said each candidate content item based on a first objective;

based on the first score of each candidate content item in the first set of candidate content items, generating a first ranking of the first set of candidate content items;

selecting a first subset of top ranking candidate content items from the first set of candidate content items based on the first ranking;

using a second targeting criteria to identify a second set of candidate content items;

for each candidate content item in the second set of candidate content items and for each candidate content item in the first subset of top ranking candidate content items selected from the first set of candidate content items, generating a second score for said each candidate content item based on a second objective that is different than the first objective;

based on the second score of each candidate content item in the second set of candidate content items and for each candidate content item in the first subset of top ranking candidate content items selected from the first set of candidate content items, generating a second ranking of the second set of candidate content items;

selecting a second subset of top ranking candidate content items from the second set of candidate content items and the first subset of top ranking candidate content items, based on the second ranking;

causing each candidate content item in the second subset to be presented on a computing device that is associated with the content request.

11. The one or more storage media of claim 10, wherein the second subset of candidate content items includes one or more candidate content items from the first subset of top ranking candidate content items selected from the first set of candidate content items and causing each candidate content item in the second subset to be presented comprises:

causing a visual indicator to be presented with each candidate content item of the one or more candidate content items from the first subset of top ranking candidate content items selected from the first set of candidate content items, but not with any other candidate content item in the second subset.

12. The one or more storage media of claim 10, wherein the second subset of candidate content items includes candidate content items from the first subset of top ranking candidate content items selected from the first set of candidate content items.

13. The one or more storage media of claim 10, wherein generating the second score comprises:
for each candidate content item in the first subset of candidate content items, generating the second score for each candidate content item based on the first objective in addition to the second objective;
for each candidate content item in the second set of candidate content items but not in the first subset of candidate content items, generating the second score not based on the first objective.

14. The one or more storage media of claim 10, wherein the instructions, when executed by the one or more processors, further cause, prior to identifying the first subset of candidate content items from the first set of candidate content items:
determining whether a first candidate content item is associated with a first resource limit that has been reached;
in response to determining that the first candidate content item is associated with the first resource limit that has been reached, excluding the first candidate content item from the first set of candidate content items;
determining whether a second candidate content item is associated with a second resource limit that has been reached; and
in response to determining that the second candidate content item is associated with the second resource limit that has not been reached, including the second candidate content item in the first set of candidate content items.

15. The one or more storage media of claim 14, wherein the instructions, when executed by the one or more processors, further cause:
including the first candidate content item in the second set of candidate content items.

16. The one or more storage media of claim 10, wherein the second objective pertains to a level of engagement.

17. The one or more storage media of claim 10, wherein the first score is based on a combination of a predicted user selection rate and a resource reduction amount.

18. The one or more storage media of claim 10, wherein the instructions, when executed by the one or more processors, further cause:
prior to receiving the content request, storing threshold data that indicates (1) a first maximum number of content items of a first type to present in a first presentation context and (2) a second maximum number of content items of the first type to present in a second presentation context that is different than the first presentation context;
identifying the first maximum number based on the electronic content being part of the first presentation context;
wherein selecting the first subset is based on the first maximum number.

* * * * *